United States Patent [19]
Emori

[11] Patent Number: 5,572,615
[45] Date of Patent: Nov. 5, 1996

[54] WAVEGUIDE TYPE OPTICAL DEVICE

[75] Inventor: Toshiyuki Emori, Kawasaki, Japan

[73] Assignee: Fujitsu Limited, Kanagawa, Japan

[21] Appl. No.: 453,126

[22] Filed: May 31, 1995

[30] Foreign Application Priority Data

Sep. 6, 1994 [JP] Japan ..................... 6-212627

[51] Int. Cl.$^6$ .............................. G02B 6/00; G02B 6/36
[52] U.S. Cl. ................................. 385/92; 385/16
[58] Field of Search ................... 385/54, 76, 88, 385/92, 17, 19, 14, 16

[56] References Cited

U.S. PATENT DOCUMENTS

| | | | |
|---|---|---|---|
| 4,735,677 | 5/1988 | Kawachi et al. | 156/659.11 |
| 4,750,799 | 6/1988 | Kawachi et al. | 385/14 |
| 5,066,097 | 11/1991 | Brandle et al. | 385/76 |
| 5,204,921 | 4/1993 | Kanai et al. | 385/17 |

OTHER PUBLICATIONS

Hitachi Hyoron vol. 75, No. 3, Mar. 19, 1993, pp. 45–50, Himi et al., "Redirection al Optical Module for Optical Subscriber Systems".

IEICE Trans. Commun., vol. E75–B, No. 9, Sep. 1992, pp. 880–885, Yoshida et al., "A Compact Optical Module with a 1.3-um/1.5-um WDM Circuit for Fiber Optic Subscriber Systems".
Technical Report of IEICE., Nov. 1993, pp. 55–60, Himi et al., "Bidirectional Transceiver Module for Optical Subscriber Systems".

*Primary Examiner*—Akm E. Ullah

[57] ABSTRACT

A waveguide type optical device connected with optical fibers and electronic wires, for converting an optical signal to an electronic signal vice versa, including a chip housing body housing an optical waveguide chip, a light emitting and detecting device assembly fitted to one side wall of the chip housing body and including both light emitting element and light detecting element precisely arranged so that the light emitting and detecting device assembly is fitted to the chip housing body by simple optical adjustment performed between waveguide terminal of the waveguide chip and the light emitting, detecting elements respectively. The chip housing body has structure so that the light emitting and detecting device assembly is the one side wall of the chip housing body and the optical fibers are connected with the waveguide chip through other side wall opposite to the one side wall, by applying a folded waveguide to the waveguide chip.

10 Claims, 8 Drawing Sheets

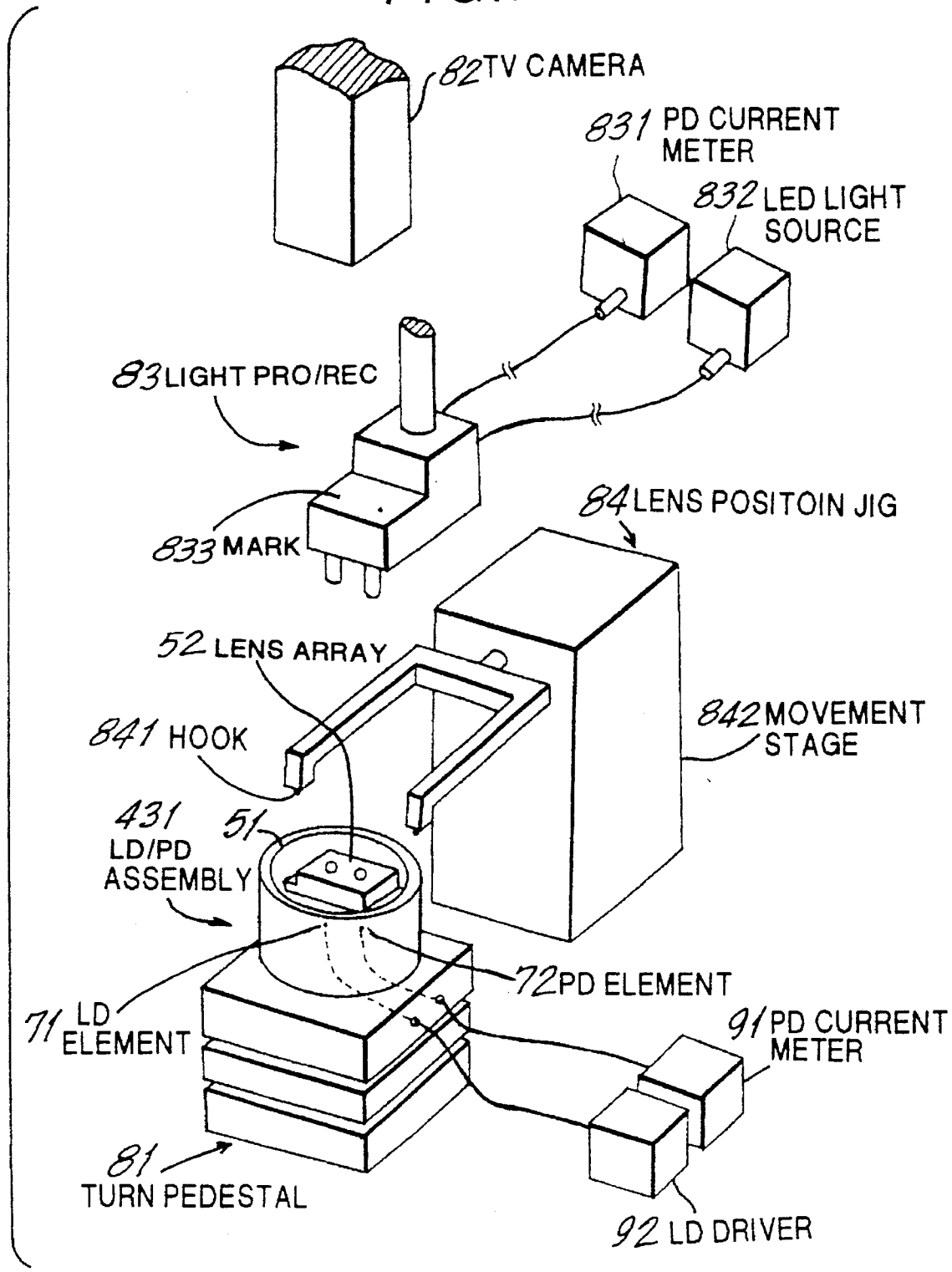

WAVEGUIDE TYPE OPTICAL DEVICE

BACKGROUND OF THE INVENTION

1. Field of the Invention

The present invention relates to a waveguide type optical device consisting of an optical waveguide chip, light emitting and detecting semiconductor devices optically connected with the optical waveguide chip and a chip housing body for housing the optical waveguide chip and mounting the light emitting and detecting semiconductor devices. In particular, the present invention relates to the structure of the waveguide type optical device and a method for simply and optically mounting light emitting and detecting semiconductor devices on the chip housing body in high precision.

2. Description of the Related Art

Different from a bulk type optical device including discrete optical elements such as a prism and lens, a waveguide type optical device is composed of high integrated optical circuits Fabricated on an optical waveguide chip, which will be abbreviated as "waveguide chip" hereinafter, under a wafer process. The waveguide chip is effective in reducing the size of the optic device, and it is expected that by virtue of the waveguide chip, a small sized optical module will be produced in low costs so that the module will be widely applied to a subscriber communication network in a multimedia communication system for example.

As examples of the optical circuits fabricated on the waveguide chip, there are an optical waveguide circuit and an optical modulator. The optical waveguide circuit, which will be abbreviated "optical waveguide" or simply "waveguide" hereinafter, is provided by processing quartz glass formed on a silicon wafer, producing a Silica-Based optical waveguide. The optical modulator is provided by diffusing titanium (Ti) on a substrate made of lithium niobate ($LiNbO_3$). In particular, the Silica-Based optical waveguide is suitable for the optical module in use. Because, the Silica-Based optical waveguide has a high matching property with an optical fiber used in a transmission line of the subscriber communication network. The optical waveguide used in the waveguide chip is designated to the Silica-Based optical waveguide hereinafter.

The light emitting or the light detecting semiconductor device or element is usually packed in a CD package used in a compact disc apparatus. Because, the CD package is easily fitted to the chip housing body. The optical semiconductor element is connected with the optical waveguide of the waveguide chip for converting an optical signal fed to the waveguide type optical device to an electrical signal or an electrical signal fed to the waveguide type optical device to an optical signal. Optical fibers of the transmission line or optical fibers connected with another waveguide type optical device are led to the waveguide type optical device for receiving or transmitting the optical signals at or from the waveguide type optical device. A connection point at which the optical fiber is connected with the optical waveguide in the waveguide chip will be called "port" hereinafter.

Two kinds of the optical semiconductor elements, a light detecting element and a light emitting element, are applied to the waveguide type optical device. A photo diode (PD) is a typical light detecting element, and a laser diode (LD) is a typical light emitting element. Therefore, the light detecting element will be called "PD element" and the light emitting element will be called "LD element" hereinafter, and a device which packs the PD element and an electrical circuit associated with the PD element will be called "PD assembly" and a device which packs the LD element and an electrical circuit associated with the LD element will be called "LD assembly" hereinafter.

FIGS. 1A and 1B illustrate schematic inside plan views of two typical waveguide type optical devices (WAVEGUIDE TYPE OPTICAL DEVICEs) (101 and 102) of the related art. The WAVEGUIDE TYPE OPTICAL DEVICE 101 or 102 includes a waveguide chip (11 or 12), a PD assembly (PD ASSEMBLY) (411 or 412), an LD assembly (LD ASSEMBLY) (412 or 422) and an optical fiber (31 or 32). The waveguide chip 11 or 12 is provided in a chip housing body (21 or 22), and the PD ASSEMBLY 411 Or 412 is fitted to the chip housing body 21 or 22 and the optical fiber 81 or 32 is placed anywhere close to the chip housing body 21 or 22.

The WAVEGUIDE TYPE OPTICAL DEVICEs 101 and 102 treat a multi-wave optical signal of for example two wavelengths $\lambda_1$ such as 1.31 μm and $\lambda_2$ such as 1.55 μm.

In FIG. 1A, WAVEGUIDE TYPE OPTICAL DEVICE 101 is for receiving an optical signal of wavelength $\lambda_1$ which will be called "received optical signal of $\lambda_1$," hereinafter, and transmitting another optical signal of $\lambda_1$ which will be called "transmitting optical signal of $\lambda_1$," hereinafter, and for interactively transferring an optical signal of wavelength $\lambda_2$ through WAVEGUIDE TYPE OPTICAL DEVICE 101. The transferring optical signal of wavelength $\lambda_2$ will be called "transferring optical signal of $\lambda_2$," hereinafter.

In FIG. 1B, WAVEGUIDE TYPE OPTICAL DEVICE 102 is for receiving received optical signals of $\lambda_1$ and $\lambda_2$ and transmitting optical signals of $\lambda_1$ and $\lambda_2$, respectively.

A waveguide (151) is fabricated on the waveguide chips 11 and 12, and in the waveguide chips 11 and 12, a wavelength-division-multiplexer (WDM) (111) is fabricated on the waveguide 151 on a transmission route of a multi-wave optical signal of wavelength $\lambda_1$ and $\lambda_2$, which will be called "multi-wave optical signal of $\lambda_1/\lambda_2$" hereinafter, and a Y type 3 dB coupler (121) is fabricated on the waveguide 151 on a transmission route of the received and transmitting optical signals of $\lambda_1$. In the waveguide chip 12, another Y type 3 dB coupler (122) is fabricated on the waveguide 151 on a transmission route of the received and transmitting or the transferring optical signals of $\lambda_1$. in FIG. 2B. The WDM 111 is for dividing a received multi-wave optical signal of $\lambda_1/\lambda_2$ into the received optical signal of $\lambda_1$ and that of $\lambda_2$ and multiplying the transmitting optical signal of $\lambda_1$ and that of $\lambda_2$ to a transmitting multi-wave optical signal of $\lambda_1/\lambda_2$.

In FIG. 1A, the received multi-wave optical signal of $\lambda_1/\lambda_2$ arrives at WAVEGUIDE TYPE OPTICAL DEVICE 101 through an optical fiber (31) of the transmission line. The optical fiber 31 is fixed to the chip housing body 21 with a bushing 301. The received multiplex optical signal of $\lambda_1/\lambda_2$ is fed to WDM 111 through a port 131 at which the optical fiber 31 is optically connected with the waveguide 151. Then at WDM 111, the received multi-wave optical signal of $\lambda_1/\lambda_2$ is divided into the received optical signal of $\lambda_1$ and that of $\lambda_2$. After dividing, the received optical signal of $\lambda_1$ is led to a PD assembly (PD ASSEMBLY) (411) through the Y type 3 dB coupler 121 and a waveguide terminal, not having a reference numeral, of the waveguide 151 and the received optical signal of $\lambda_2$ is led to the optical fiber 32 through a port 132. The Y type 3 dB coupler 121 is for dividing the power of the received optical signal of $\lambda_1$ half, so that the half power of the received optical signal of $\lambda_1$ is sent to PD ASSEMBLY 411 and an LD assembly (LD ASSEMBLY) (412) respectively. Then the received optical signal (half power) of $\lambda_1$ is detected and converted to a received electrical signal at LD ASSEMBLY 412 and the received electrical signal is output from LD ASSEMBLY 412 through an electric wire 4111. The other half power of the received optical signal of $\lambda_1$ is sent to LD ASSEMBLY 412. However, LD ASSEMBLY 412 produces no output. Because, LD ASSEMBLY 412 has the function only for emitting an optical signal. The received optical signal of $\lambda_2$ is led to the optical fiber 32, which is fixed to the chip housing body 21 with a bushing 302, through a port 132. Meanwhile, when a transmitting electrical signal is fed to LD ASSEMBLY 412 through an electric wire 4121, the transmitting electrical signal is converted to a transmitting optical signal of $\lambda_1$ so that the transmitting optical signal of $\lambda_1$ is emitted from LD ASSEMBLY 412. The transmitting optical signal of $\lambda_1$ is fed to WDM 111 through another waveguide terminal, not having a reference numeral, of the waveguide 151 and the Y type 3 dB coupler 121. The power of the transmitting optical signal of $\lambda_1$ arrived at the Y type 3 dB coupler 121 from LD ASSEMBLY 412 is almost sent to WDM 111. Because, by virtue of the power isolation property of the Y type 3 dB coupler, the power sent to PD ASSEMBLY 411 is almost 20 dB less than the power sent to WDM 111. In FIG. 1A, the transferring optical signal of $\lambda_2$ fed to WAVEGUIDE TYPE OPTICAL DEVICE 101 through the optical fiber 32 fixed to the chip housing body 21 with a bushing 302 is sent to WDM 111 through the port 132 and the waveguide 151. At WDM 111, the transferring optical signal of $\lambda_2$ arrived at WAVEGUIDE TYPE OPTICAL DEVICE 101 is multiplied with the transmitting optical signal of $\lambda_1$ from LD ASSEMBLY 412, producing a transmitting multi-wave optical signal of $\lambda_1/\lambda_2$. The transmitting multi-wave optical signal of $\lambda_1/\lambda_2$ produced at WDM 111 is transmitted from WAVEGUIDE TYPE OPTICAL DEVICE 101 through the optical fiber 31. The multi-wave optical signal of $\lambda_1/\lambda_2$ transmitted from WAVEGUIDE TYPE OPTICAL DEVICE 101 will be called "transmitted multi-wave optical signal of $\lambda_1/\lambda_2$" hereinafter.

In FIG. 1B, the same as the description of the received multi-wave optical signal of $\lambda_1/\lambda_2$ in FIG. 1A, when the received multi-wave optical signal of $\lambda_1/\lambda_2$ arrives at WAVEGUIDE TYPE OPTICAL DEVICE 102 through the optical fiber 31, the received multi-wave optical signal of $\lambda_1/\lambda_2$ is divided into the received optical signals of $\lambda_1$ and $\lambda_2$. After dividing, the same as described in FIG. 1A, the received optical signal of $\lambda_1$ is led to PD ASSEMBLY 411 through the Y type 3 dB coupler 121 and a waveguide terminal not having a reference numeral. However, the received optical signal of $\lambda_2$ is led to PD ASSEMBLY 421 through the Y type 3 dB coupler (122) having the same function as the Y type 3 dB coupler 121 and a waveguide terminal not having a reference numeral. Then the received optical signal of $\lambda_2$ is detected and converted to another received electrical signal at PD ASSEMBLY 421 and the received electrical signal is output from PD ASSEMBLY 421 through an electric wire 4211. As described in reference with FIG. 1A, when the transmitting electrical signal is fed to LD ASSEMBLY 412 in FIG. 1B, the electrical signal is converted to the transmitting optical signal of $\lambda_1$. The transmitting optical signal of $\lambda_1$ is emitted from LD ASSEMBLY 412 and red to WDM 111 through a waveguide terminal not having reference numeral and the Y type 3 dB coupler 121. Meanwhile, another electronic signal fed to LD ASSEMBLY 422 is converted to a transmitting optical signal of $\lambda_2$ and the transmitting optical signal of $\lambda_2$ is sent to WDM 111 through a waveguide terminal not having a reference numeral and the Y type 3 dB coupler 122. As a result, the transmitting optical signal of $\lambda_1$ sent from LD ASSEMBLY 412 and the transmitting optical signal of $\lambda_2$ sent from LD ASSEMBLY 422 are multiplied to a transmitting multi-wave optical signal of $\lambda_1/\lambda_2$ at WDM 111. The transmitting multi-wave optical signal of $\lambda_1/\lambda_2$ is transmitted from WAVEGUIDE TYPE OPTICAL DEVICE 102 to the transmission line through the optical fiber 31, as the transmitted multi-wave optical signal of $\lambda_1/\lambda_2$.

In FIGS. 1A and 1B, the arrows depicted with $\lambda_1$, $\lambda_2$ and $\lambda_1/\lambda_2$ show the transferring directions of the received, transmitted, transmitting or a transferring optical signals of $\lambda_1$, $\lambda_2$ and $\lambda_1/\lambda_2$.

In the related art, the waveguide type optical device described in reference with FIG. 1A or 1B has the following problems. Generally, in the fabrication of the waveguide type optical device, delicate optical adjustment has been required to connect the optical fiber of the transmission line, the LD assembly, and the PD assembly respectively with the waveguide provided in the waveguide type optical device. A lot of skill has been required to the optical adjustment for the optical connection, so that in the fabrication of the waveguide type optical device, a large percentage of man-hours has been wasted for the optical adjustment. In particular, in the process of installing the LD assembly to the waveguide type optical device, it takes a lot of time for the optical adjustment. Because, an optically emitting aperture of the LD element is so small as 1 to 2 µm. Furthermore, the waveguide type optical device of the related art has the PD assembly and the LD assembly individually, so that the optical adjustment has to be performed individually. This results in wasting a lot of time for the optical adjustment to the PD element in the PD assembly and the LD element in the LD assembly. This causes a large manhours to the fabrication of the waveguide type optical device.

In FIG. 1A, the optical adjustment is required to be performed twice for PD ASSEMBLY 411 and LD ASSEMBLY 412, and in FIG. 1B, the optical adjustment is required to be performed four times for PD ASSEMBLY 411, LD ASSEMBLY 412, PD ASSEMBLY 421 and LD ASSEMBLY 422. Above all, it has taken a lot of time for the optical adjustment on LD ASSEMBLY 412 in FIGS. 1A and 1B and LD ASSEMBLY 422 in FIG. 1B. This has been the first problem of the waveguide type optical device in the related art.

In FIGS. 1A and 1B, even though the waveguide chips 11 and 12 are fabricated to a small size by the wafer process, PD ASSEMBLies 411 and 421 and LD ASSEMBLies 412 and 422 must be individually fitted to the chip housing bodies 21 and 22. As a result, it has been impossible to make the space for arranging WAVEGUIDE TYPE OPTICAL DEVICE 101 or 102 small. This has been the second problem of the waveguide type optical device in the related art.

As shown in FIG. 1A, the optical fibers 31 and 32 pass through two walls of the chip housing body 21, which are opposed to each other. Therefore, when the optical fibers 31 and 32 are bunched together close by WAVEGUIDE TYPE OPTICAL DEVICE 101, the space for making the optical fiber 31 or 32 pass a side of the chip housing body 21 is needed. Furthermore, since PD ASSEMBLY 411 and LD ASSEMBLY 412 are connected with the waveguide circuit lead out from the Y type 8 dB coupler 121 in FIG. 1A or 1B and PD ASSEMBLY 421 and LD ASSEMBLY 422 are connected with the waveguide circuit lead out from the Y type 3 dB coupler 122 in FIG. 1B, the PD ASSEMBLY 411 and LD ASSEMBLY 412 and the PD ASSEMBLY 421 and LD ASSEMBLY 422 are fitted to the walls, which are adjacent to each other, of the chip housing body 21 and the chip housing body 21, respectively. Therefore, when the electric wires connected with PD ASSEMBLY 411 and LD ASSEMBLY 412 are bunched together close by WAVEGUIDE TYPE OPTICAL DEVICEs 101 or 102 and when the electric wires connected with PD ASSEMBLY 421 and LD ASSEMBLY 422 are bunched together close by WAVEGUIDE TYPE OPTICAL DEVICEs 102, the space for making the electric wires pass the side of the chip housing body 21 or 22 is needed, respectively. As a result, though WAVEGUIDE TYPE OPTICAL DEVICE 101 (102) becomes small in size due to the adoption of the waveguide chip 11 (12) to WAVEGUIDE TYPE OPTICAL DEVICE 101 (102), large space has to be provided for WAVEGUIDE TYPE OPTICAL DEVICE 101 (102) in consideration of the place for arranging the optical fibers 31 and 32 and the electric wires around WAVEGUIDE TYPE OPTICAL DEVICE 101 (102). In particular, when many waveguide type optical devices are arranged close by each other, a lot of spaces for passing the optical fibers and the electric wires are required around the waveguide type optical devices, which results in requiring a large space for arranging the waveguide type optical devices. This has been the third problem of the waveguide type optical device in the related art.

SUMMARY OF THE INVENTION

Therefore, the present invention is for solving the first, second and third problems in the waveguide type optical device of the related art.

An object (the first object) of the present invention is to decrease the manhour for fabricating the waveguide type optical device, in particular, to decrease the manhour wasted, in the prior art, for the optical adjustment required for mounting the PD assembly and the LD assembly to a chip housing body of the waveguide type optical device.

Another object (the second object) of the present invention is to decrease the space for arranging the waveguide type optical devices.

The first and second objects are achieved by newly providing an LD/PD assembly assembling both LD element and PD element, instead of individual LD assembly and PD assembly. The LD/PD assembly consists of a main assembly for housing the LD and PD elements and a holder for holding the main assembly and fitting the LD/PD assembly to the chip housing body of the waveguide type optical device. The holder has a circular edge face to be fitted to a designated place on an assembly side wall (a LD/PD wall) of the chip housing body. The designated place is provided on the LD/PD wall so that:

two waveguide terminals of a waveguide circuit fabricated on a waveguide chip housed in the chip housing body are positioned just inside of the designated place so as to be optically connected with the LD element and PD element respectively, when the LD/PD assembly is fitted to the designated place;

a plane, which will be called "terminal plane" hereinafter, laying the waveguide terminals is parallel with a plane laying the circular edge face, when the LD/PD assembly is fitted to the designated place; and a line, which will be called "fitting center line" hereinafter, perpendicular do the terminal plane and laying a center of a distance, which will be called "terminal distance" hereinafter, between the waveguide terminals lies a center of the circular edge face.

In the main assembly, the LD and PD elements are arranged so as to have positions lie on lines perpendicular to the terminal plane and laying the waveguide terminals respectively, providing a level difference in a direction of the fitting center line for preventing interactive interference from occurring between rays of light emitted from the LD element and light coming into the PD element.

In the holder, a lens array is fitted so as to be placed between the waveguide terminal and the LD or PD element. The lens array includes a pair of planar micro-lenses through which the light emitted from one of the waveguide terminals is focused onto the PD element and the light emitted from the LD element is focussed onto the other of the waveguide terminals. Furthermore, the lens array has an lightproof layer made of reflective metal evaporated on the surface of the lens layer at a side of the PD and LD elements, for preventing the light emitted from the LD element from coming into the PD element.

By virtue of assembling both LD and PD elements in the LD/PD assembly, the manhour individually wasted for performing the optical adjustment to the LD and PD assemblies in the related art can be decreased, and by virtue of arranging the LD and PD elements by giving carefully optical consideration previously in the fabricating process of the LD/PD assembly, the manhour wasted, in the related art, to perform the optical adjustment every time the LD and PD assemblies are fitted to the chip housing body individually, can be reduced.

In order to achieve the second object of the present invention, the chip housing body is improved so that the LD/PD assembly is only fitted to the LD/PD wall and all optical fibers to be connected with the LD/PD assembly are passed through a wall, which will be called "fiber side wall" hereinafter, opposite to the LD/PD wall. The above improvement is performed by applying a folded waveguide to the waveguide circuit in the waveguide chip. By virtue of applying the folded waveguide, particularly in case where the optical signal only transferred through the waveguide type optical device, the optical signal is fed to the waveguide type optical device through an optical fiber connected with the folded waveguide through the fiber side wall and the optical signal fed into the folded waveguide is led out from the waveguide type optical device through another optical fiber passed through the same fiber side wall.

By virtue of assembling the LD and PD elements in the LD/PD assembly, the number of the LD and PD assembly can be reduced, and by virtue of the improvement of the chip housing body, the optical fibers and electric wires crawled around the chip housing body in the related art can be all removed. This results in decreasing the arranging space of the waveguide type optical device.

BRIEF DESCRIPTION OF THE DRAWINGS

FIG. 7 is a schematic drawing for illustrating an example of an adjustment apparatus of LENS ARRAY 52 placed in LD/PD ASSEMBLY 431;

DESCRIPTION OF THE PREFERRED EMBODIMENTS

Figure 1A:
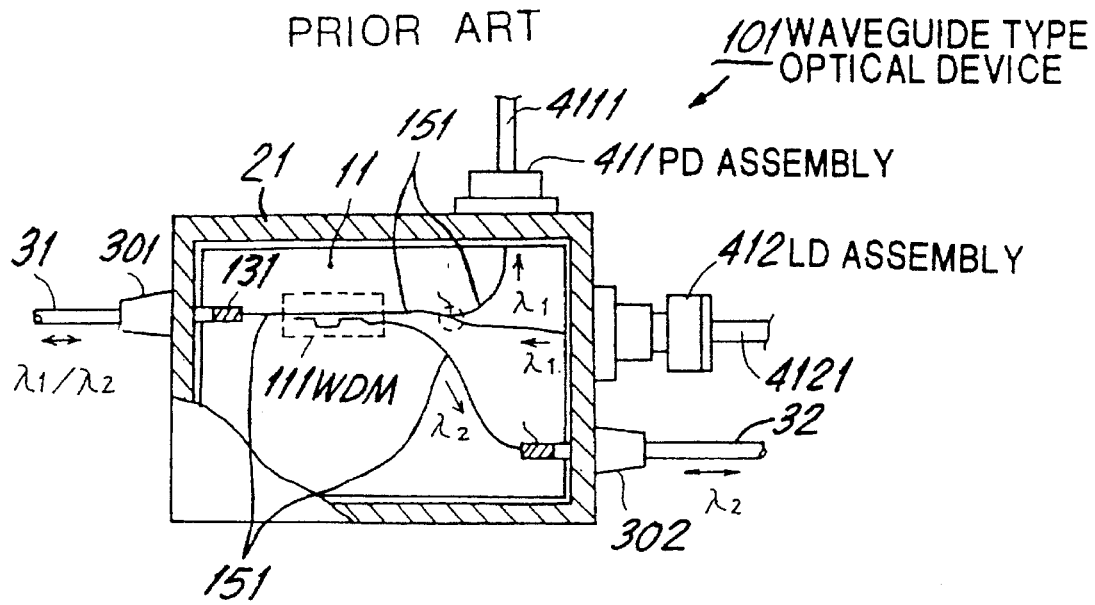
FIG. 1A is a schematic inside plan view of a typical WAVEGUIDE TYPE OPTICAL DEVICE 101 of the related art.
Figure 1B:
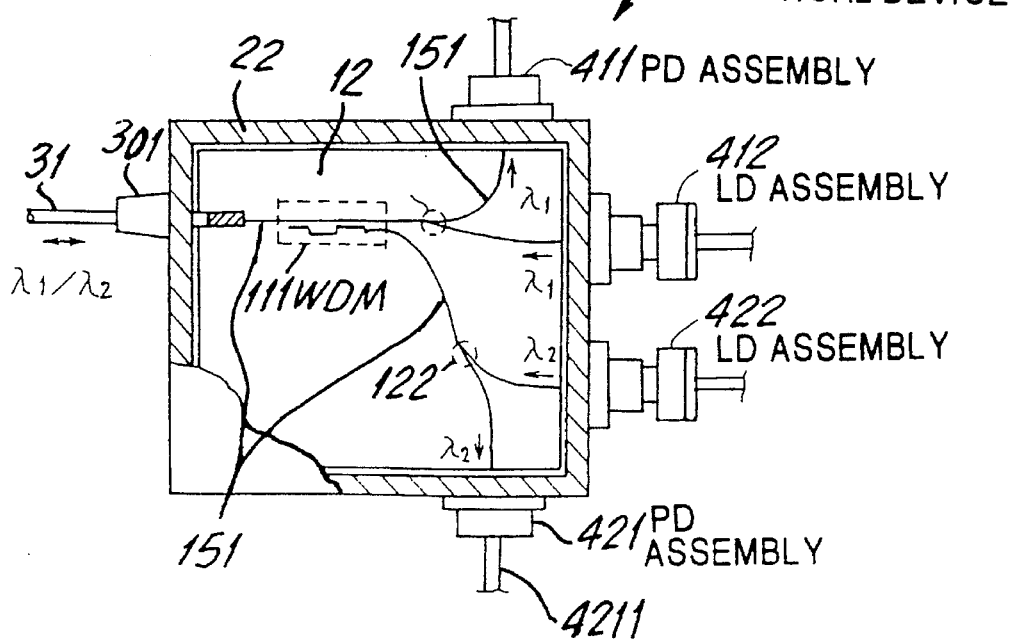
FIG. 1B is a schematic inside plan view of another typical WAVEGUIDE TYPE OPTICAL DEVICE 102 of the related art.
Figure 2A:
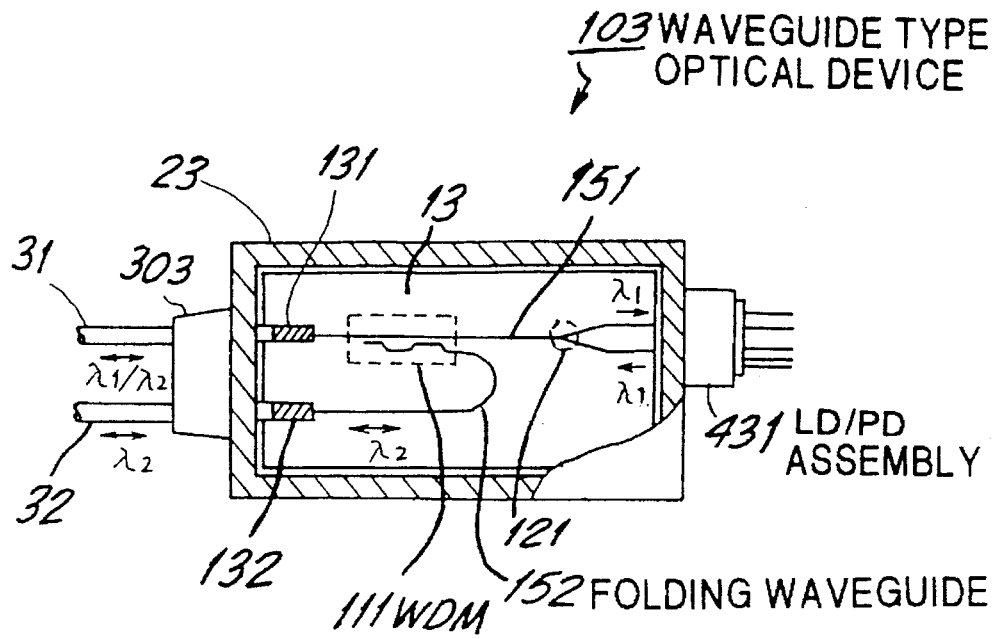
FIG. 2A is a schematic inside plan view of WAVEGUIDE TYPE OPTICAL DEVICE 103 for illustrating the first preferred embodiment of the present invention.
Figure 2B:
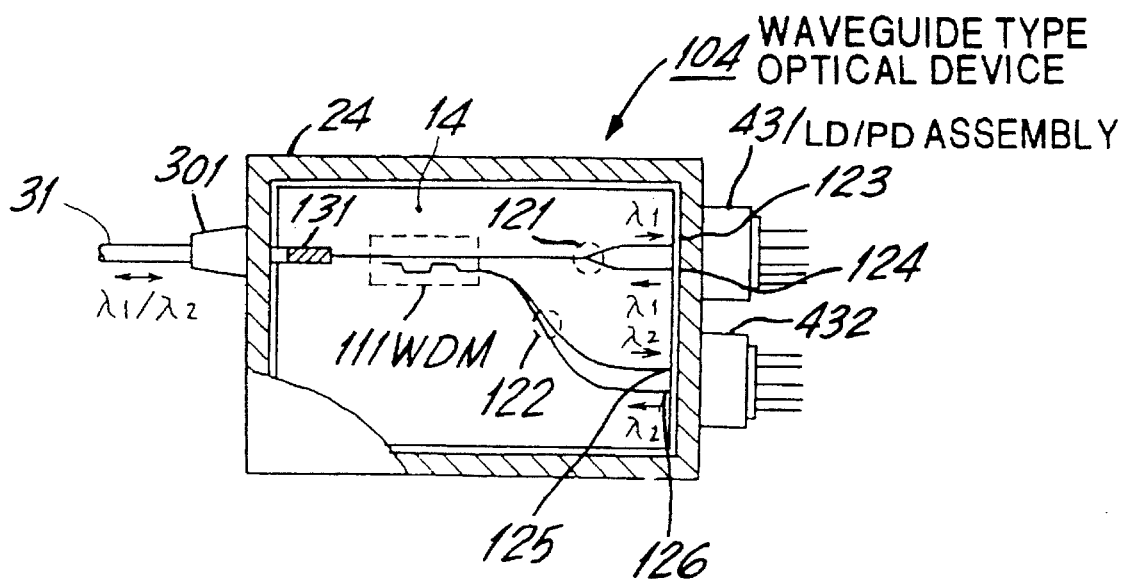
FIG. 2B is a schematic inside plan view of WAVEGUIDE TYPE OPTICAL DEVICE 104 for illustrating the second preferred embodiment of the present invention.

FIG. 2A is a schematic plan view of WAVEGUIDE TYPE OPTICAL DEVICE 103 which is the first preferred embodiment of the present invention and functionally corresponds to WAVEGUIDE TYPE OPTICAL DEVICE 101 of the related art described in reference with FIG. 1A. FIG. 2B is a schematic plan view of WAVEGUIDE TYPE OPTICAL DEVICE 104 which is the second preferred embodiment of the present invention and functionally corresponds to WAVEGUIDE TYPE OPTICAL DEVICE 102 of the related art described in reference with FIG. 1B. In FIGS. 2A and 2B, the same reference numeral as in FIGS. 1A and 1B designates the same unit or part as in FIGS. 1A and 1B.

In FIG. 2A, different from WAVEGUIDE TYPE OPTICAL DEVICE 101 of the related art, WAVEGUIDE TYPE OPTICAL DEVICE 103 includes an LD/PD assembly (LD/PD ASSEMBLY) (431) and a folded waveguide (FOLDED WAVEGUIDE) (152). In FIG. 2B, different from WAVEGUIDE TYPE OPTICAL DEVICE 102 of the related art, WAVEGUIDE TYPE OPTICAL DEVICE 104 includes LD/PD ASSEMBLY 431 and LD/PD ASSEMBLY 432.

The LD/PD ASSEMBLies 431 and 432 are fitted to a designated place of a wall, which will be called "assembly side wall" or "LD/PD wall" hereinafter, of a chip housing body (23) and FOLDED WAVEGUIDE 152 is fabricated on a wave guide chip (13) so as to be connected straight with the optical fiber 32 through a bushing 303 fitted to a wall, which will be called "fiber side wall" hereinafter, of the chip housing body 23, opposite to the LD/PD wall. The LD/PD ASSEMBLY 431 assembles both LD element and PD element in it. The LD and PD elements are not depicted in FIG. 2A. When the LD and PD elements are assembled in LD/PD ASSEMBLY 431, the LD and PD elements are precisely arranged and positioned in LD/PD ASSEMBLY 431 under considering the optical connection to waveguide terminals (123 and 124) of the waveguide. By virtue of the precise arrangement and positioning, the LD and PD elements can be easily and correctly connected with the waveguide terminals 123 and 124 by simply fitting LD/PD ASSEMBLY 431 to the designated position on the LD/PD wall.

In FIG. 2B, different from WAVEGUIDE TYPE OPTICAL DEVICE 102 of the related art, WAVEGUIDE TYPE OPTICAL DEVICE 104 includes LD/PD ASSEMBLY 431 and LD/PD ASSEMBLY 432. The LD/PD ASSEMBLies 31 and 432 are fitted to designated places of the LD/PD wall the same as in case of LD/PD ASSEMBLY 431 in FIG. 2A, and LD/PD ASSEMBLY 432 has the same construction and function as LD/PD ASSEMBLY 431.

In FIG. 2A, a received multi-wave optical signal of $\lambda_1/\lambda_2$ arrived at WAVEGUIDE TYPE OPTICAL DEVICE 103 through the optical fiber 31 is fed to WDM 111 at which the received multi-wave optical signal of $\lambda_1/\lambda_2$ is divided into received optical signals of $\lambda_1$ and $\lambda_2$. The received optical signal of $\lambda_1$ fed to LD/PD ASSEMBLY 431 is converted to a received electrical signal relating to $\lambda_1$ by the PD element in LD/PD ASSEMBLY 431. Meanwhile, the received optical signal of $\lambda_2$ is transferred to the optical fiber 32 through FOLDED WAVEGUIDE 152.

Further in FIG. 2A, when the LD element in LD/PD ASSEMBLY 431 receives a transmitting electrical signal relating to $\lambda_2$, a transmitting optical signal of $\lambda_2$ is emitted from LD/PD ASSEMBLY 431 so as to be led to WDM 111 through the waveguide terminal 124 and the Y type 3 dB coupler 121. Meanwhile, when a transferring optical signal of $\lambda_2$ is arrived at WAVEGUIDE TYPE OPTICAL DEVICE 103 through the optical fiber 32, the transferring optical signal of $\lambda_2$ is led to WDM 111 through FOLDED WAVEGUIDE 152. Then the transferring optical signal of $\lambda_2$ and the transmitting optical signal of $\lambda_2$ are multiplied at WDM 111, producing a transmitting multi-wave optical signal of $\lambda_1/\lambda_2$ which is output from WAVEGUIDE TYPE OPTICAL DEVICE 103 through the optical fiber 31.

In FIG. 2B, a received multi-wave optical signal of $\lambda_1/\lambda_2$ arrived at WAVEGUIDE TYPE OPTICAL DEVICE 104 through the optical fiber 31 is fed to WDM 111 at which the received multi-wave optical signal of $\lambda_1/\lambda_2$ is divided into received optical signals of $\lambda_1$ and $\lambda_2$. The received optical signal of $\lambda_1$ is fed to LD/PD ASSEMBLY 431 and converted to the received electrical signal relating to $\lambda_2$ the same as LD/PD ASSEMBLY 431 in FIG. 2A. Meanwhile, the received optical signal of $\lambda_2$ is fed to LD/PD ASSEMBLY 432 having the same function as LD/PD ASSEMBLY 431 and converted to the received electrical signal relating to $\lambda_2$.

Further in FIG. 2B, when the LD elements in LD/PD ASSEMBLies 431 and 432 receive the transmitting electrical signals of $\lambda_1$ and $\lambda_2$ respectively, the transmitting optical signals of $\lambda_1$ and $\lambda_2$ are emitted from LD/PD ASSEMBLY 431 and 432 and led to WDM 111 through the waveguide terminals 124 and 126 and Y-COUPLERs 121 and 122, respectively. Then the transmitting optical signals of $\lambda_1$ and $\lambda_2$ are multiplied at WDM 111, producing a transmitting multi-wave optical signal of $\lambda_1/\lambda_2$ which is output from WAVEGUIDE TYPE OPTICAL DEVICE 104 as a transmitted multi-wave optical signal of $\lambda_1/\lambda_2$ through the optical fiber 31.

When the LD and PD elements are assembled in LD/PD ASSEMBLY 431 in FIGS. 2A and 2B and LD/PD ASSEMBLY 432 in FIG. 2B, the precise arrangements and positions of the LD and PD elements are performed in LD/PD ASSEMBLies 431 and 432. As a result, the complicated optical adjustment for optically connecting the PD and LD elements with the waveguide terminals 123, 124, 125 and 126 becomes unnecessary. This reduces the manhours for fabricating WAVEGUIDE TYPE OPTICAL DEVICEs 103 and 104.

In FIG. 2A, LD/PD ASSEMBLY 431 is fitted to the designated place of the LD/PD wall and the optical fibers 31 and 32 are fixed to the fiber side wall opposed to the LD/PD wall at the bushing 303 by virtue of providing FOLDED WAVEGUIDE 152 to the waveguide chip 13, and in FIG. 2B, LD/PD ASSEMBLies 431 and 432 are fitted to the LD/PD wall and the optical fiber 31 is fixed to the fiber side wall opposed to the LD/PD wall at the bushing 301. As a result, using a waveguide type optical device like WAVEGUIDE TYPE OPTICAL DEVICE 103 or 104, a plurality of the waveguide type optical devices can be arranged without consideration of the passing place of the electric cables and the optical fibers associated with the waveguide type optical devices, which results in reducing the place for arranging the waveguide type optical devices.

Since the waveguide chip installed in the waveguide type optical device is well known, the fabrication steps of the waveguide chip are omitted to be detailed. However, in order to realize the optical connection between the pair of waveguide terminals and LD/PD ASSEMBLY 431 (432) and the structure of FOLDED WAVEGUIDE 152, the outline of the fabrication steps of the waveguide chip 13 (14) will be described bellow.

A porous glass layer is formed on a silicon layer substrate by a flame hydrolysis deposition method. The porous glass layer formed on the silicon layer substrate is made optically transparent by sintering which is performed under the circumstances at temperature 1340° C. in an electric furnace. By virtue of the sintering, a silica-based optical waveguide substrate composed of an under-clad layer and a core layer and formed on the under-clad layer is fabricated so as to have the property that the difference of the refractive indices of the under-clad layer and the core layer is 0.75% and the thickness of the core layer is 6 μm. An optical circuit is formed in the core layer by photolithographic technique and reactive ion etching technique so as to have 6 μm in width and height. An optical waveguide is formed by depositing a porous glass layer, which becomes an over-clad layer, on the substrate having the optical circuit, by the flame hydrolysis deposition method. Then, a substrate including an optical waveguide is formed by sintering the substrate having the optical circuit under He gas circumstances at temperature 1200° C., making the optical circuit transparent.

After fabricating the substrate including the optical waveguide, the port 131 (132), WDM 111 of wavelength 1.55 μm and 1.31 μm, the Y type 3 dB coupler 121 of wavelength 1.31 μm and the Y type 3 dB coupler 122 of wavelength 1.55 μm, FOLDED WAVEGUIDE 152 and the waveguide terminals are fabricated on the optical waveguide. The substrate of the optical waveguide including these parts is called the waveguide chip 13 (14). The waveguide chip 13 (14) is installed and bonded to the chip housing body 23 (24) made of e.g. Kovar, so as to be used as a module which is WAVEGUIDE TYPE OPTICAL DEVICE 103 (104). In the process of making the waveguide chip 13 (14) up to the module, the waveguide terminals 123 and 124 (123, 124, 125 and 126) are precisely positioned in the waveguide chip 13 (14) by providing 2 mm distance in-between respectively, so that when LD/PD ASSEMBLY 431 (432) is fitted to the designated place of the chip housing body 23 (24), the optical connection between LD/PD ASSEMBLY 431 (432) and the pair of the waveguide terminals are easily performed respectively without any kind of precise optical adjustment as done in the prior art.

Figure 3A:
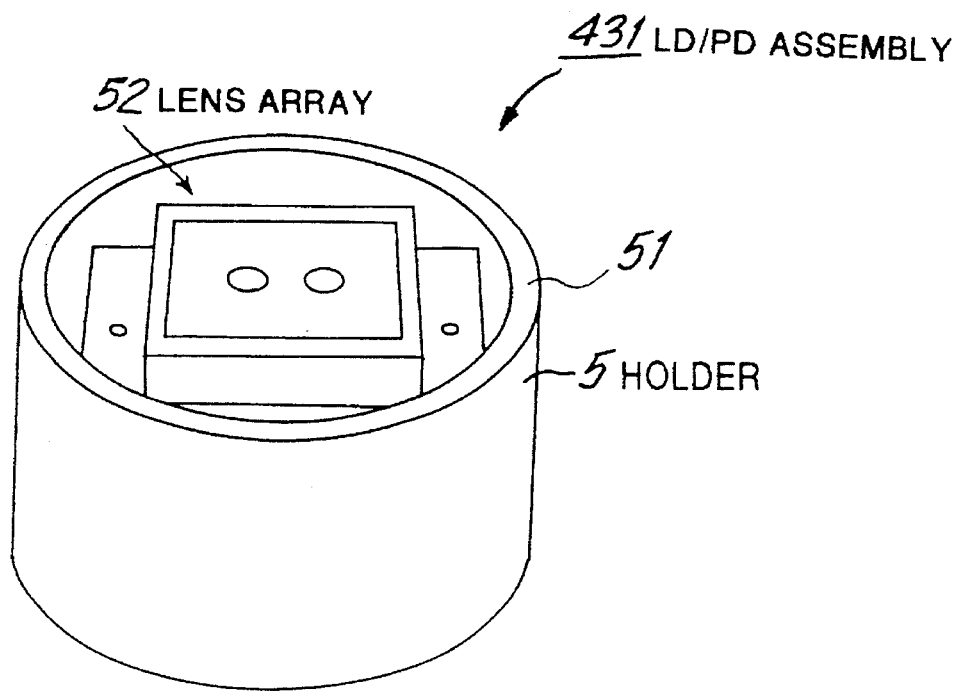
FIG. 3A is a schematic perspective view of LD/PD ASSEMBLY 431.
Figure 3B:
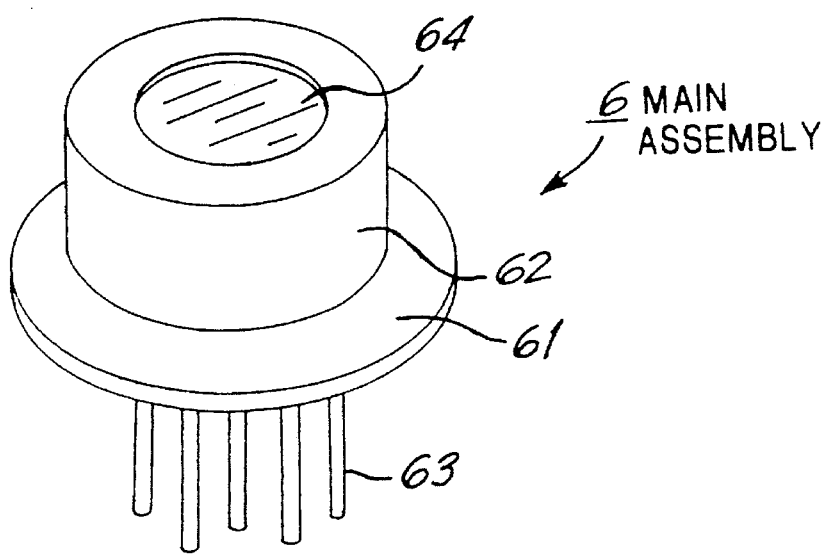
FIG. 3B is a schematic perspective view of MAIN ASSEMBLY 6.

In FIGS. 2A and 2B, since LD/PD ASSEMBLY 431 has the same structure and function as the LD/PD ASSEMBLY 432, LD/PD ASSEMBLY 431 in FIG. 2A will be representatively described as the third preferred embodiment of the present invention, in reference with FIGS. 3A, 3B, 4, 5A, 5B and 6. In FIGS. 3A and 3B, the same reference numeral as in FIGS. 2A and 2B designates the same part as in FIGS. 2A and 2B, and in FIGS. 3A, 3B, 4, 5A, 5B and 6, the same reference numeral designates the same part.

Figure 4:
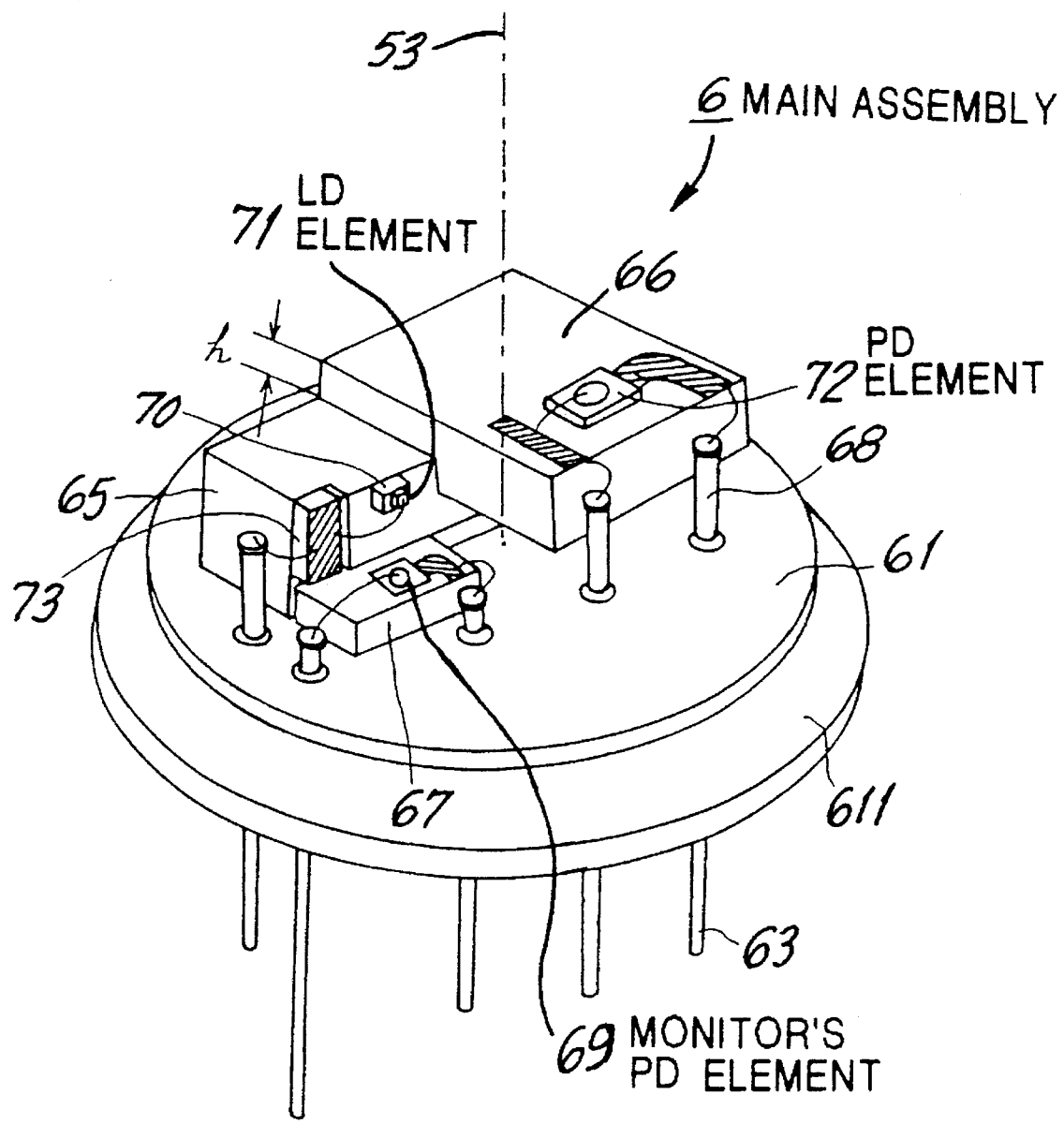
FIG. 4 is a schematic perspective view of the inside of MAIN ASSEMBLY 6.
Figure 5A:
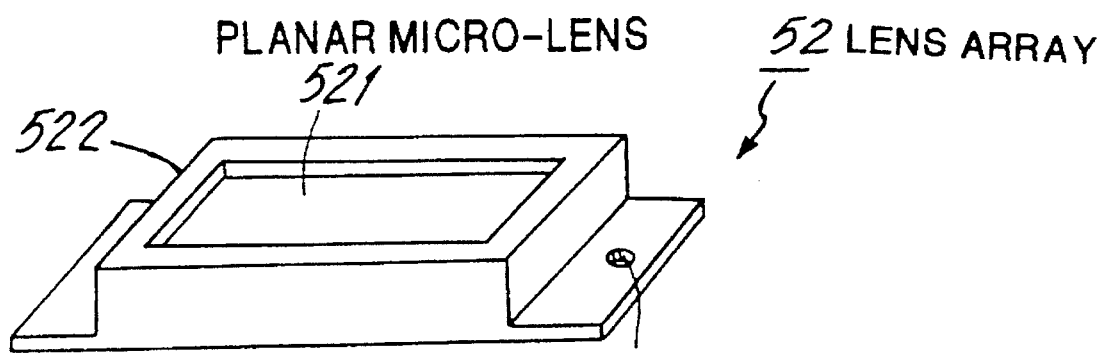
FIG. 5A is a schematic perspective view of LENS ARRAY 52.
Figure 5B:
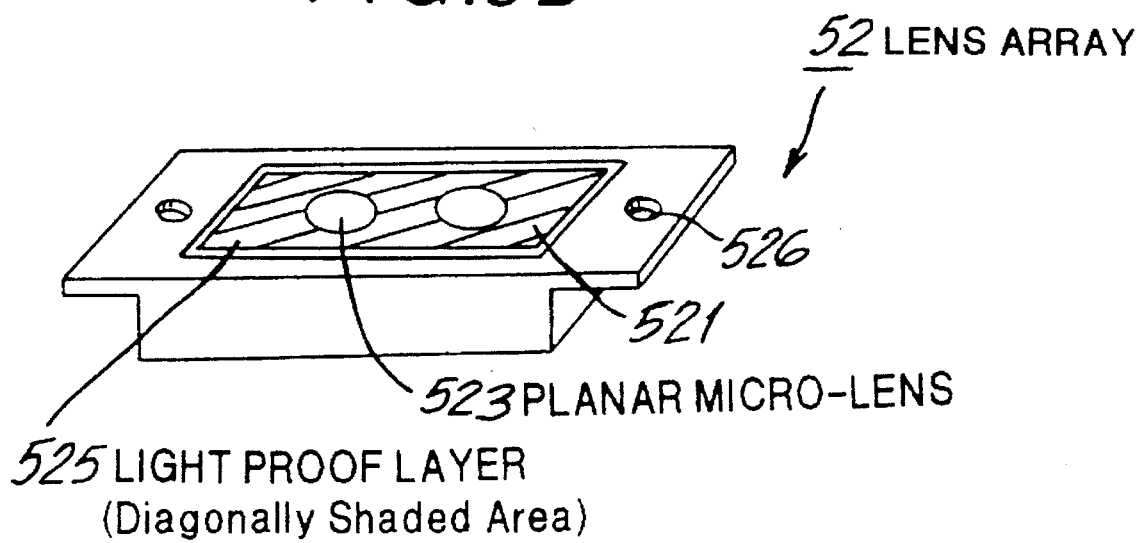
FIG. 5B is a schematic perspective view of LENS ARRAY 52, illustrated the LENS ARRAY 52 in FIG. 5A upside down.
Figure 6:
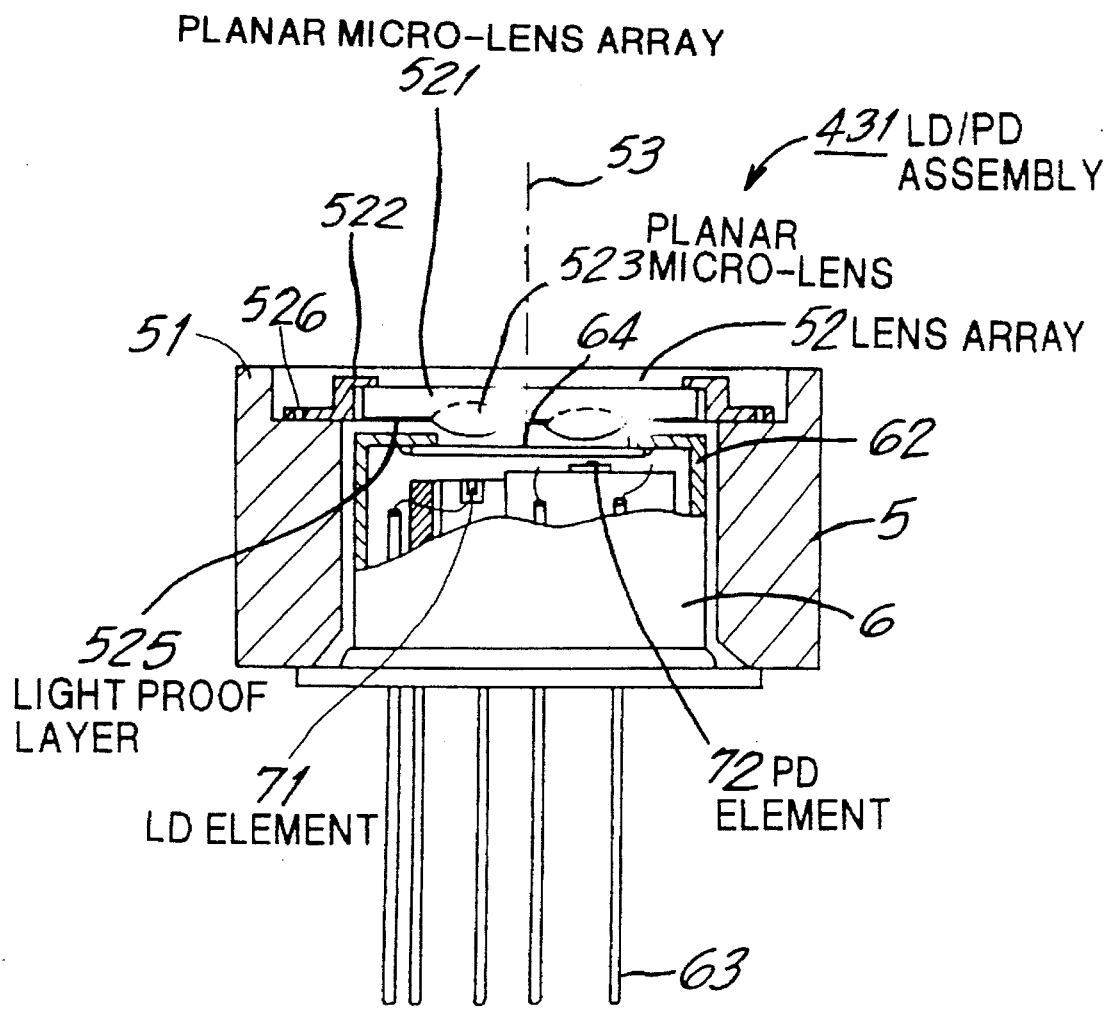
FIG. 6 is a partial sectional side elevation view of LD/PD ASSEMBLY 431.

FIG. 3A is a schematic perspective view of LD/PD ASSEMBLY 431 placed so that an edge face (51) to be fitted to the LD/PD wall of the chip housing body 23 is depicted upward, and FIG. 3B is a schematic perspective view of a main assembly (MAIN ASSEMBLY) (6) which is internally fitted to a holder (HOLDER) (5) of LD/PD ASSEMBLY 431. FIG. 4 is a schematic perspective view of the inside of MAIN ASSEMBLY 6, removing a cap (62) of MAIN ASSEMBLY 6. FIG. 5A is a schematic perspective view of a lens array (LENS ARRAY) (52) of LD/PD ASSEMBLY 431, and FIG. 5B is a schematic perspective view of LENS ARRAY 52, illustrating LENS ARRAY 52 of FIG. 5A upside down. FIG. 6 is a partial sectional side elevation view of LD/PD ASSEMBLY 431. FIGS. 3A, 3B, 4, 5A and 6 are depicted so that the waveguide terminals 123 and 124, not depicted in FIG. 4 but in FIG. 2A, are placed upward in the drawings when LD/PD ASSEMBLY 431 is fitted to the designated place of the LD/PD wall.

As shown in FIGS. 3A and 3B, LD/PD ASSEMBLY 431 is roughly divided into HOLDER 5 and MAIN ASSEMBLY 6. The HOLDER 5 has a cylindrical external form having 11 mm external diameter and 10 mm height, and MAIN ASSEMBLY 6 has a cylindrical external form having 5.8 mm external diameter and 6 mm height. The HOLDER 5 has hollow structure in which MAIN ASSEMBLY 6 is fitted. A lens array (LENS ARRAY) (52) is provided in HOLDER 5 at a place withdrawn a little inward from a plane laying the edge face 51. In FIG. 3B, MAIN ASSEMBLY 6 consists of a stem (61), connection terminals (63) provided through the stem 61, an LD and a PD element (not depicted in the figure) mounted on the stem 61 and a cap (62) for sealing the LD and the PD element in inert gas. A piece of sapphire glass (64) having anti-reflective coating on the both surfaces thereof is provided on the top of the cap 62. When MAIN ASSEMBLY 6 is fitted to HOLDER 5, the received optical signal of $\lambda_1$ enters the PD element and the transmitting optical signal of $\lambda_1$ is emitted from the LD element, passing through LENS ARRAY 52 and the sapphire glass 64.

In order to realize the internal structure of MAIN ASSEMBLY 6, the assembling steps of MAIN ASSEMBLY 6 will be described below in reference with FIG. 4.

Step 1) The following blocks are previously fabricated: a block (65) made of Kovar for mounting an LD element (LD ELEMENT) (71); a block (66) made of ceramics for mounting a PD element (PD ELEMENT) (72), so that electrodes made from an electrically conductive layer are formed on the block 66; and a block (67) made of ceramics for mounting a monitor PD element (MONITOR'S PD ELEMENT) (69), so that an electrode made from an electrically conductive layer is formed on the block 67.

Step 2) The stem 61 made of SPC is fabricated, providing the proper number of the connection terminals 63 there through.

Step 3) The following steps are advanced: MONITOR'S PD ELEMENT 69 is mounted on the block 67 so that MONITOR'S PD ELEMENT 69 is connected with the electrode formed on the block 67; the block 67 is solder to the stem 61 so that MONITOR'S PD ELEMENT 69 is positioned right under LD ELEMENT 71 whose arrangement will be described later; and MONITOR 8 PD ELEMENT 69 is electrically connected with posts of the connection terminals 63 through bonded wires.

Wherein, MONITOR'S PD ELEMENT 69 is a PD element for monitoring an emitting state of LD ELEMENT 71, so that LD ELEMENT 71 emits the optical signal such as the transmitting optical signal of $\lambda_1$ stably even though the ambient temperature of LD ELEMENT 71 is changed. Generally, the emission property of the LD element is easily influenced due to the change of the ambient temperature thereof. The output from MONITOR'S PD ELEMENT 69 is fed to a drive circuit, not depicted in FIG. 4, of LD ELEMENT 71, so as not to change the emitted optical power from LD ELEMENT 71 even though the ambient temperature is changed.

Step 4) The block 65 for mounting LD ELEMENT 71 and the block 66 for mounting PD ELEMENT 72 are soldered to each other, providing a level difference "h" between the upper surfaces of LD ELEMENT 71 and PD ELEMENT 72 to be mounted thereon in a direction of a fitting center line (53) which is shown in FIGS. 4 and 6. Wherein, the fitting center line 53 is a center line of fitting LD/PD ASSEMBLY 431 to the designated place of the LD/PD wall. The fitting center line 53 is a line along which LD/PD ASSEMBLY 431 is fitted to the designated place. The waveguide terminals 123 and 124 are placed at the inside of the designated place, optically corresponding to LD ELEMENT 71 and PD ELEMENT 62 of LD/PD ASSEMBLY 431 fitted to the designated place, as described before. Not depicting in a figure, the waveguide terminals 123 and 124 provides a distance, which will be called "terminal distance" hereinafter, between the waveguide terminals 123 and 124 and a plane, which will be called "terminal plane" hereinafter, laying the waveguide terminals 123 and 124. Since each of the waveguide terminals 123 and 124 has a small flat face, the terminal plane is determined by the waveguide terminals 123 and 124. As a result, describing correctly, the fitting center line 53 is a line perpendicular to the terminal face and laying a center of the terminal distance. The level difference "h", which is approximately 100 μm, is for preventing the interactive interference from occurring between rays of light emitted from LD ELEMENT 71 and light incident on PD ELEMENT 72.

Step 5) A heat sink 70 is soldered to the block 65 and LD ELEMENT 71 is soldered to the heat sink 70.

Step 6) An insulation block 73 made of ceramics is fabricated so that an electrically conductive layer is formed on a surface thereof. Then the insulation block 73 is soldered to the block 65 as shown in FIG. 4.

Step 7) The PD ELEMENT 72 is soldered to the block 66 so that a part of PD ELEMENT 72 is connected with the electrode. The LD ELEMENT 71 and PD ELEMENT 72 are fixed to the stem 61 so that the LD ELEMENT 71 and PD ELEMENT 72 make a distance, which will be called "element distance" hereinafter, between the LD and PD elements 71 and 72 projected on the terminal plane along the fitting center line 53 and the center of the element distance lies on the fitting center line 53. The element distance is the same as the terminal distance of 2 mm. The positioning of the LD ELEMENT 71 and PD ELEMENT 72 is very important for decreasing the manhours to perform the optical adjustment required when LD/PD ASSEMBLY 431 is fitted to the LD/PD wall of the chip housing body 23. Therefore, in the step 7, PD ELEMENT 72 and LD ELEMENT 71 are positioned in high accuracy. In accordance with the data on the fabrication of the LD/PD assembly, the PD element and the LD element can be positioned within ±8 λm.

Step 8) The block 65 mounting LD ELEMENT 71 through the heat sink 70 and soldered with the block 66 mounting PD ELEMENT 72 is soldered to the stem 61. The soldering is performed so that a circle center of the stem 61 and the center of the element distance lies on the fitting center line.

Step 9) The wiring is performed between PD ELEMENT 72 and the posts, close thereto, of the connection terminals 63 through the electrodes formed on the block 66 and between LD ELEMENT 71 and the post close to the insulation block 73, of the connection terminal 63 through the electrically conductive layer formed on the insulation block 73.

Step 10) The cap 62 having the sapphire glass 64 is put on the stem 61, which mounts PD ELEMENT 72, LD ELEMENT 71, MONITOR'S PD ELEMENT and others, and sealed with a flange 611 of the stem 61 in the atmosphere of inert gas (see FIG. 3B).

The MAIN ASSEMBLY 6 fabricated by taking the above steps 1) to 10) is fitted to HOLDER 5 not equipped LENS ARRAY 52, and then HOLDER 5 is welded to the flange 611 having a dimension of 6.2 mm in diameter and 1.6 mm in thickness, applying YAG laser technic. Not depicting in FIG. 4, a chip of electronic circuits such as a drive circuit for PD ELEMENT 72 and an amplifier for LD ELEMENT can be mounted in MAIN ASSEMBLY 6, if needed.

The LENS ARRAY 52 to be mounted in HOLDER 5 of LD/PD ASSEMBLY 431 will be described in reference with FIGS. 5A and 5B. The LENS ARRAY 52 consists of a planer micro-lens array (PLANER MICRO-LENS ARRAY) (521) and a lens holder 522 for holding PLANER MICRO-LENS ARRAY 521. The PLANER MICRO-LENS ARRAY 521 is fabricated so that two planer micro-lenses (PLANER MICRO-LENSes) (523) are set in array on a glass substrate by partially changing the refractive index of the glass substrate at the parts becoming the lens, applying the well known ion exchange technique. Furthermore, a lightproof layer (LIGHTPROOF LAYER) (525) is formed on a surface at the rear of PLANER MICRO-LENS ARRAY 521 which is depicted by diagonal lines in FIG. 5B. The LIGHTPROOF LAYER 525 is formed on the rear surface of the glass substrate by evaporating optically reflective metal such as aluminum on the rear surface and providing pinhole array on the lightproof layer by etching, at the parts of planer micro-lenses (PLANER MICRO-LENSes) 523.

The LENS ARRAY 52 is placed between a group of waveguide terminals 123 and 124 and a group of LD and PD ELEMENTs 71 and 72 mounted in MAIN ASSEMBLY 6. The PLANER MICRO-LENSes 523 are positioned so that PLANER MICRO-LENSes 523 lie on lines connecting the waveguide terminals and LD and PD ELEMENTs 71 and 72, respectively. The LIGHTPROOF LAYER 525 is provided for preventing the light rays emitted from LD ELEMENT 71 from entering the waveguide's edge face provided for PD ELEMENT 72 and for preventing the light rays emitted from the other waveguide's edge face from entering LD ELEMENT 71. Two holes 526 provided to a lens holder 522 are lens adjusting holes used for the optical adjustment of the LENS ARRAY 52.

The arrangement situation of LENS ARRAY 52 in LD/PD ASSEMBLY 431 is shown in FIG. 6. The LENS ARRAY 52 is finally fixed to HOLDER 5 by welding performed by YAG laser, after the optical adjustment between LENS ARRAY 52 and LD ELEMENT 71 and between LENS ARRAY 52 and PD ELEMENT 72. The optical adjustment to LENS ARRAY 52 will be described below in reference with FIG. 7.

FIG. 7 is a schematic drawing for illustrating an example of an adjustment apparatus for adjusting the mounting position of LENS ARRAY 52 placed in LD/PD ASSEMBLY 431. In FIG. 7, the same reference numeral as in FIG. 3A designates the same assembly or part as in FIG. 3A. The adjustment apparatus is mainly composed of a turning pedestal (TURN PEDESTAL) (81) for slightly turning LD/PD ASSEMBLY 431 mounted thereon, in omnidirectional, a TV camera (TV CAMERA) (82) for observing the position of LENS ARRAY 52 in LD/PD ASSEMBLY 431 mounted on TURN PEDESTAL 81, a light projector and receptor (LIGHT PRO/REC) (83) for projecting a beam of light toward PD ELEMENT 72 fixed to LD/PD ASSEMBLY 431 and receiving light emitted from LD ELEMENT 71 fixed to LD/PD ASSEMBLY 431 mounted on TURN PEDESTAL 81, and a lens array positioning jig (LENS POSITION JIG) (84) for positioning LENS ARRAY 52 by slight movement thereof.

The TURN PEDESTAL 81, TV CAMERA 82, LIGHT PRO/REC 83 and LENS POSITION JIG 84 are set on an optical adjustment massive base (BASE) not depicted in FIG. 7 and fixed to BASE after slight movement due to the optical adjustment, respectively.

The LIGHT PRO/REC 83 includes array of two optical fibers having the same distance between them and the same dimension of respective edge face and optical characters as those of the waveguide circuit of WAVEGUIDE CHIP 13 (see FIG. 2A), to be optically connected with LD/PD ASSEMBLY 431. A PD current meter (PD CURRENT METER) (831) and an LED light source (LED LIGHT SOURCE) (832) are equipped with LIGHT PRO/REC 83. The PD CURRENT METER 831 is connected with the optical fiber of LIGHT PRO/REC 83 for measuring the PD current of LD ELEMENT 71 in LD/PD ASSEMBLY 431 and received at LIGHT PRO/REC 83, and LED LIGHT SOURCE 832 is connected with the other optical fiber of LIGHT PRO/REC 83 for projecting light toward PD ELEMENT 72 in LD/PD ASSEMBLY 431 mounted on TURN PEDESTAL 81. Two marks (MARKs) (833) are marked on the top of LIGHT PRO/REC 83 so as to be observed by TV CAMERA 82. The MARKs 833 are previously marked so as to minutely indicate the positions of the edge faces of the optical fibers in LIGHT PRO/REC 83. The MARKs 833 are used for the coarse alignment of LIGHT PRO/REC 83 against LD ELEMENT 71 and PD ELEMENT 72 in LD/PD ASSEMBLY 431 mounted on TURN PEDESTAL 81. A PD CURRENT METER (91) and an LD driver (LD DRIVER) (92) are equipped with LD/PD ASSEMBLY 431 mounted on TURN PEDESTAL 81. The PD CURRENT METER 91 is for measuring the PD current thereof due to light projected from LIGHT PRO/REC 83 and LD DRIVER 92 is for driving LD ELEMENT 71 so as to emit light toward LIGHT PRO/REC 83.

Positioning of LENS ARRAY 52 in LD/PD ASSEMBLY 431 is performed in accordance with the following steps of:

step 1) mounting LD/PD ASSEMBLY 431 on TURN PEDESTAL 81 before setting LENS ARRAY 52 in LD/PD ASSEMBLY 431, removing LIGHT PRO/REC 83 from space above LD/PD ASSEMBLY 431, positioning TV CAMERA 82 so that the image of LD/PD ASSEMBLY 431 can be obtained at a TV monitor, not depicted in FIG. 7, of TV CAMERA 82 and adjusting TURN PEDESTAL 81 so that images of LD ELEMENT 71 and PD ELEMENT 72 in LD/PD ASSEMBLY 431 are obtained at previously designated position in the monitor;

step 2) bringing LIGHT PRO/REC 83 into the space above LD/PD ASSEMBLY 431, watching the TV monitor and operating a slight movement stage, not depicted in FIG. 7, so that MARKs 833 are just coincided with the designated position in the TV monitor and the distance between the edge of the optical fibers in LIGHT PRO/REC 83 and the edge face 51 (see FIG. 3A) of HOLDER 5 of LD/PD ASSEMBLY 431 becomes a distance equal to the distance between one of the waveguide terminals and the edge face 51 of HOLDER 5 of LD/PD ASSEMBLY 431 fitted to the LD/PD wall of the chip housing body 23 (see FIG. 2A);

step 3) setting LENS ARRAY 52 on LD/PD ASSEMBLY 431 mounted on TURN PEDESTAL 81, inserting a lens array adjustment hooks (HOOKs) (841) of LENS POSITION JIG 84 into the lens adjustment holes 526 (see FIG. 5A), performing the course adjustment of the mounting position of LENS ARRAY 52 by operating LED LIGHT SOURCE 832 so that light is emitted from one optical fiber of LIGHT PRO/REC 83 toward LD/PD ASSEMBLY 431, carefully moving LENS POSITION JIG 84 by operating MOVEMENT STAGE 842 so that OPTICAL PD CURRENT METER 91 indicates the maximum output PD current and performing the fine adjustment of the mounting position of LENS ARRAY 52 by operating LD DRIVER 92 so that LD ELEMENT 71 emits light toward LIGHT PRO/REC 83, carefully moving LENS POSITION JIG 84 by operating MOVEMENT STAGE 842 so that PD CURRENT METER 831 indicates the maximum output PD current, wherein the reason why the course adjustment is performed to PD ELEMENT 72 and the fine adjustment is performed to LD ELEMENT 71 is that the reception aperture of PD ELEMENT 72 is as large as 80 μm but that of LD ELEMENT 71 is as small as 1~2 μm; and step 4) fixing LENS ARRAY 52 to LD/PD ASSEMBLY 431 by welding due to the YAG laser and after welding, removing HOOK 841 of LENS POSITION JIG so that the mounting of LENS ARRAY 52 to LD/PD ASSEMBLY 431 is terminated.

Figure 8A:
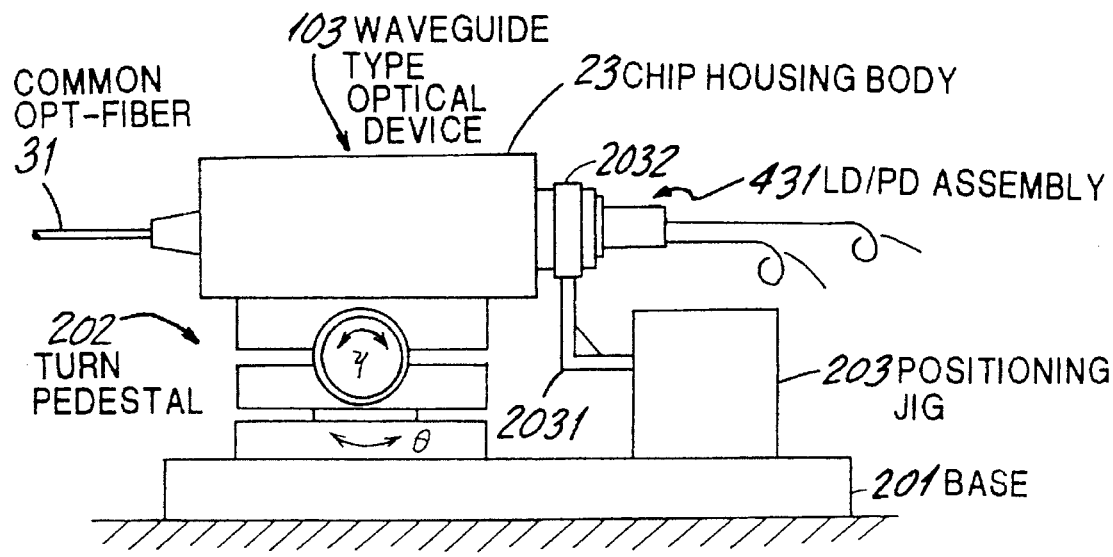
FIG. 8A is a schematic drawing for illustrating how to fit LD/PD ASSEMBLY 431 to LD/PD ASSEMBLY 431.
Figure 8B:
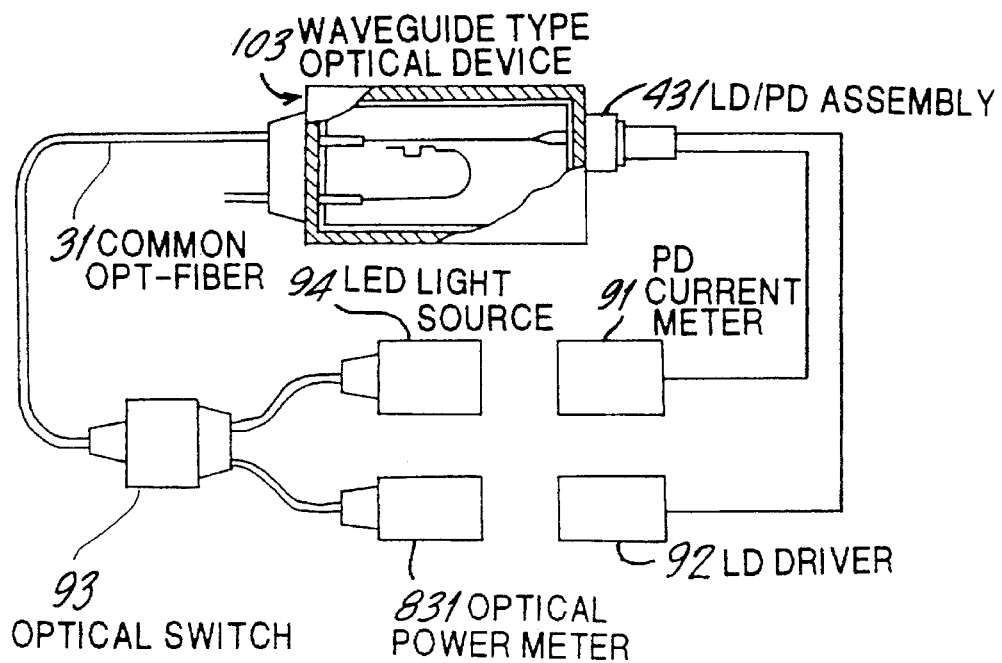
FIG. 8B is a schematic block diagram for illustrating how to check the optical connection between LD/PD ASSEMBLY 431 and LD/PD ASSEMBLY 431.

The LD/PD ASSEMBLY 431 including LENS ARRAY 52 is fitted to the LD/PD wall of the chip housing body 23 of WAVEGUIDE TYPE OPTICAL DEVICE 103 (see FIG. 2A). In order to fit LD/PD ASSEMBLY 431 to the PD/LD wall, a fitting apparatus of the LD/PD assembly is prepared. FIG. 8A is an illustrating diagram for illustrating how to fit LD/PD ASSEMBLY 431 to the LD/PD wall by using the fitting apparatus. FIG. 8B is a schematic block diagram for illustrating how to check the optical connection during the fitting apparatus is used for fitting LD/PD ASSEMBLY 431 to LD/PD ASSEMBLY 431. In FIGS. 8A and 8B, the same reference numeral as in FIGS. 2A and 7 designates the same device or part as in FIGS. 2A and 7. A method of fitting LD/PD ASSEMBLY 431 to WAVEGUIDE TYPE OPTICAL DEVICE 103 by using the fitting apparatus is the fourth preferred embodiment of the present invention.

The fitting apparatus is consisted of a base (BASE) (201), a turning pedestal which turns in omunidrectional (TURN PEDESTAL) (202) for mounting LD/PD ASSEMBLY 431 and a positioning jig (POSITIONING JIG) (203) for positioning LD/PD ASSEMBLY 431 so as to fit LD/PD ASSEMBLY 431 to WAVEGUIDE TYPE OPTICAL DEVICE 103 under optimum optical connection between LD/PD ASSEMBLY 431 and WAVEGUIDE TYPE OPTICAL DEVICE 103. The TURN PEDESTAL 202 and POSITIONING JIG 203 are mounted on BASE 201 fast as shown in FIG. 8A. Meanwhile, as shown in FIG. 8B, PD CURRENT METER 91 and LD DRIVER 92 are connected with LD/PD ASSEM- BLY 431 for measuring the PD current due to light received at PD ELEMENT 72 and emitting light from LD ELEMENT 71 in LD/PD ASSEMBLY 431, respectively, and PD CURRENT METER 831 and LED LIGHT SOURCE 882 are connected with WAVEGUIDE TYPE OPTICAL DEVICE 103 through an optical switch (OPTICAL SWITCH) (93) and the optical fiber (COMMON OPT-FIBER) 31. The LD/PD ASSEMBLY 481 can be fitted to WAVEGUIDE TYPE OPTICAL DEVICE 108 in accordance with the following steps which are:

step 1) mounting WAVEGUIDE TYPE OPTICAL DEVICE 103 on TURN PEDESTAL 202, fixing LD/PD ASSEMBLY 431 by a clamp 2032 provided at the end of a yoke 2081 of POSITIONING JIG 203 and approaching LD/PD ASSEMBLY 431 to WAVEGUIDE TYPE OPTICAL DEVICE 103 so that there is a little space between the LD/PD wall of WAVEGUIDE TYPE OPTICAL DEVICE 108 and the edge face 51 (see FIG. 8A) of LD/PD ASSEMBLY 431;

step 2) relatively approaching LD/PD ASSEMBLY 481 to the LD/PD wall by slightly turning TURN PEDESTAL 202 in direction $\eta$ and $\theta$ as shown in FIG. 8A and slightly operating POSITIONING JIG 203 so that LD/PD ASSEMBLY 431 is minutely moved up in three-dimensional direction and tightly fitting the edge face 51 of LD/PD ASSEMBLY 431 to the LD/PD wall of WAVEGUIDE TYPE OPTICAL DEVICE 103 by repeating operation of TURN PEDESTAL 202 and POSITIONING JIG 203;

step 3) after confirming that LD/PD ASSEMBLY 431 is fitted to WAVEGUIDE TYPE OPTICAL DEVICE 103 tightly, operating OPTICAL SWITCH 93 so that LED LIGHT SOURCE 832 is connected with COMMON OPT-FIBER 31, making LED LIGHT SOURCE 832 emit light of wavelength $\lambda_1$, performing the coarse optical adjustment between LD/PD ASSEMBLY 431 and WAVEGUIDE TYPE OPTICAL DEVICE 103 by investigating PD CURRENT METER 91 and repeating step 2) if necessary, until PD CURRENT METER 91 indicates the maximum output current;

step 4) after performing the coarse optical adjustment, operating OPTICAL SWITCH 93 so that PD CURRENT METER 831 is connected with COMMON OPT-FIBER 31, operating LD DRIVER 92, performing the fine optical adjustment between LD/PD ASSEMBLY 431 and WAVEGUIDE TYPE OPTICAL DEVICE 103 by observing PD CURRENT METER 831 and carefully repeating step 2) if necessary, until PD CURRENT METER 831 indicates the maximum PD output current and then fixing LD/PD ASSEMBLY 431 to WAVEGUIDE TYPE OPTICAL DEVICE 103 by welding performed by using YAG laser.

By virtue of mounting the PD element and the LD element in the LD/PD assembly and introducing the coarse adjustment as mentioned above, the manhours can be reduced in the fabrication of the waveguide type optical device.

What is claimed is:

1. A waveguide type optical device connected with at least an optical fiber and electronic wires, for converting an optical signal transferred to the waveguide type optical device through the optical fiber to an electronic signal sent out from the waveguide type optical device through the electronic wire and an electronic signal sent to the waveguide type optical device through an electronic wire to an optical signal sent out from the waveguide type optical device through the optical fiber, said waveguide type optical device comprising:

an optical waveguide chip on which an optical waveguide circuit including at least a pair of waveguide terminals is formed;

a chip housing body for housing said optical waveguide chip; and a light emitting and detecting device assembly fitted to said chip housing body, including at least a pair of a light emitting element and a light detecting element, the light emitting element and the light detecting element being arranged before said light emitting and detecting device assembly is fitted to said chip housing body, so that said the light emitting element and the light detecting element are optically connected with the waveguide terminals respectively after said light emitting and detecting device assembly is fitted to the chip housing body.

2. A waveguide type optical device according to claim 1, wherein said chip housing body has an assembly side wall to which only said light emitting and detecting device assembly is fitted and a fiber side wall opposite to the assembly side wall, through which only the optical fiber connected with the optical waveguide circuit passes.

3. A waveguide type optical device according to claim 2, wherein the optical waveguide circuit includes a folded waveguide to be connected with an optical fiber at an end of the folded waveguide and with another optical fiber at another end of the folded waveguide so that both optical fibers are passed through the fiber side wall.

4. A waveguide type optical device according to claim 1, wherein the light emitting element is a laser diode and the light detecting element is a photo diode.

5. A waveguide type optical device according to claim 1, wherein the light emitting element and the light detecting element are arranged in said light emitting and detecting device assembly so that: an element distance being a distance between the light emitting element and the light detecting element projected on a terminal plane laying the waveguide terminals, is the same as a terminal distance between the waveguide terminals; and a center of the element distance lies on a fitting center line perpendicular to the terminal plane and passing through a center of the terminal distance.

6. A waveguide type optical device according to claim 5, wherein the light detecting element and the light emitting element are positioned by providing a level difference (h) there between in a direction the same as a direction of the fitting center line so that interactive interference is prevented from occurring between rays of light emitted from the light emitted element and light incident on the light detecting element.

7. A waveguide type optical device according to claim 6, wherein said light emitting and detecting device assembly further includes a lens array placed close to the waveguide terminals, said lens array including two planar micro-lenses which are positioned so that centers of the planar micro-lenses lie respectively on a line connecting the light emitting element with one of the waveguide terminals and the light detecting element with other of the waveguide terminals.

8. A waveguide type optical device according to claim 7, wherein said lens array further includes lightproof means attached to a surface of said lens array, faced toward the light emitting and detecting elements, so that the light emitted from the light emitting element is prevented from being detected by the light detecting element.

9. A waveguide type optical device according to claim 8, wherein said lightproof means is a lightproof layer made of optically reflective metal and formed on the surface of said lens array, faced to the light emitting and detecting elements, by performing evaporation, excepting portions of the planar micro-lenses.

10. A fabrication method of a waveguide type optical device converting an optical signal transferred to the waveguide type optical device to an electronic signal and an electronic signal arrived at the waveguide type optical device to an optical signal and including an optical waveguide chip having an optical waveguide circuit optically connected with a light emitting and detecting device assembly fitted to a chip housing body of the waveguide type optical device and including at least a pair of a light emitting element and a light detecting element, said method comprising the step of optically connecting the light emitting element and the light detecting element with waveguide terminals of the optical waveguide circuit by performing course optical adjustment to the optical connection between one of the waveguide terminals and the light detecting element and fine optical adjustment to the optical connection between other of the waveguide terminals and the light emitting element.

* * * * *